Inventor
HUGH MURTAGH
by
Herbert H. Thompson
HIS Attorney

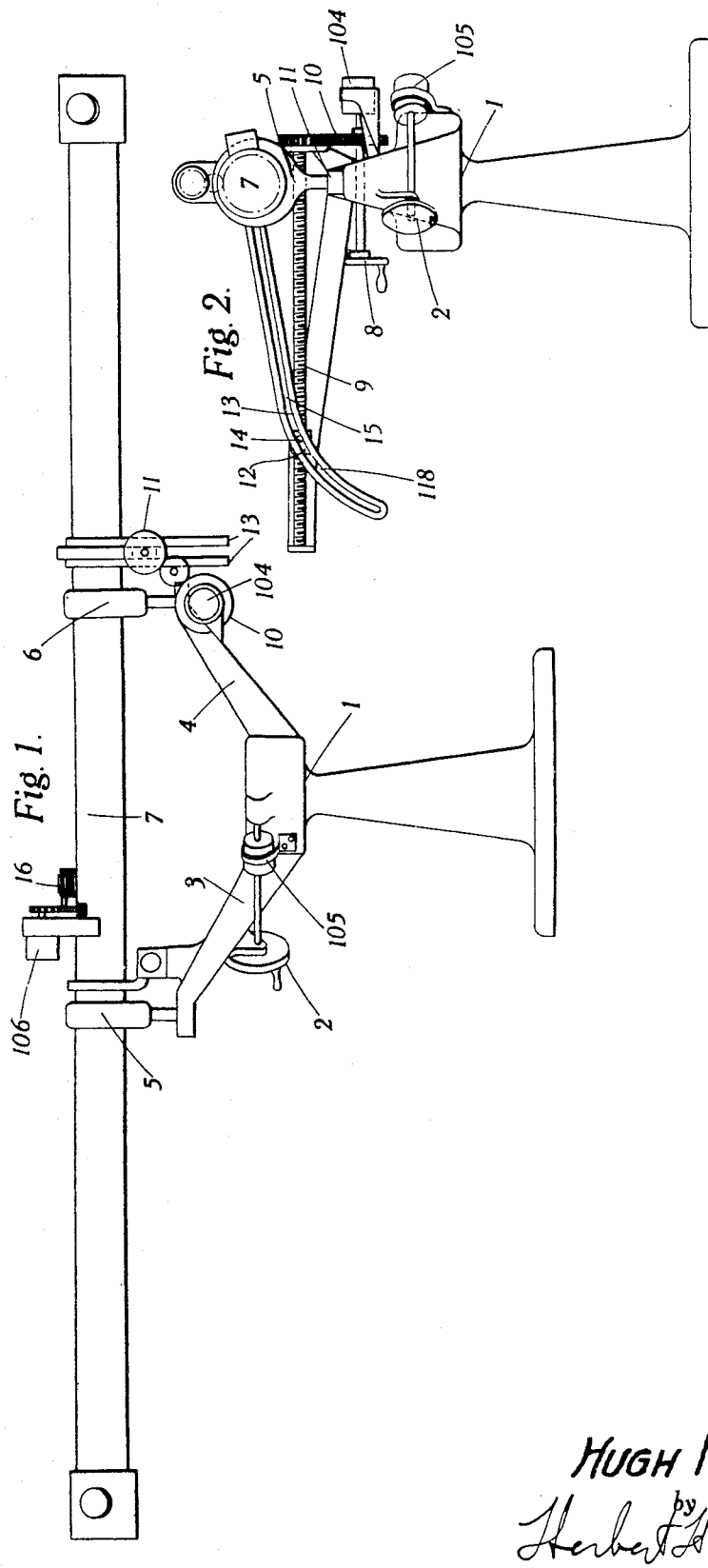

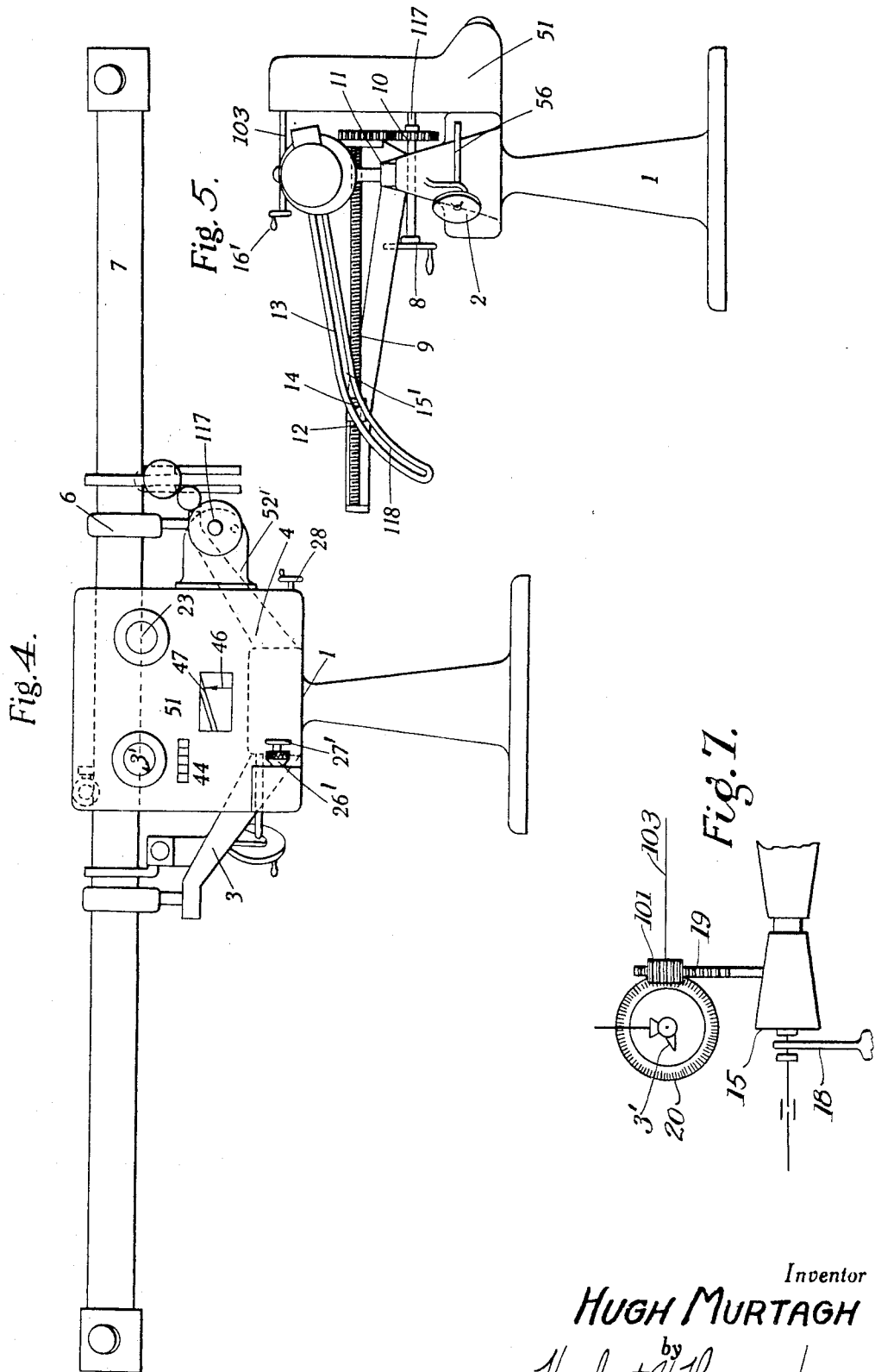

Patented Feb. 16, 1943

2,311,187

UNITED STATES PATENT OFFICE 2,311,187

RANGE FINDER, HEIGHT FINDER, AND THE LIKE

Hugh Murtagh, Laleham-on-Thames, England, assignor to Sperry Gyroscope Company, Incorporated, Brooklyn, N. Y., a corporation of New York Application April 21, 1939, Serial No. 269,299
In Great Britain April 23, 1938

6 Claims. (Cl. 88—2.2)

This invention relates to range-finders or height-finders for ascertaining the distance or height of a moving target such as an aircraft.

The invention consists in apparatus for ascertaining the distance of a moving object, such as an aircraft, comprising a rotatable observation member, e. g. a tube carrying optical devices, and means whereby an element moving uniformly in rotation or translation, effects rotational movements of said member and moves proportionally to the cotangent of the angle of displacement of said member from a zero position.

The invention further consists in a range-finder or height-finder for aircraft comprising observation means rotatable about a substantially horizontal axis, an element movable uniformly in rotation or translation, causing movement of the observation means, arranged so that movement of the second-mentioned element is proportional to the cotangent of the angle of elevation of the observation means.

The invention specified in the next two preceding paragraphs is concerned more especially with comparatively large angles of displacement or elevation, and may be arranged so that for small angles, say of five degrees or less, the rate of movement of the observation means is greater than that proportional to the cotangent of the angle.

Referring to an observation device having an elevation angle $E_0$, will be appreciated that a control for movements thereof (e. g. to operate sights following the target) in accordance with cot $E_0$ is particularly suitable, as can be seen from the consideration of the case when the target is an aircraft flying at a constant height and a constant speed in a straight line passing almost directly over the range-finder. In this case, the elevation control member is stationary when the target is at its shortest distance from the range-finder, but, when the target is at a distance great compared with this shortest distance, the control member of the range-finder, if it employs a control according to cot $E_0$, moves at practically constant speed, whereas, if the range-finder employs a control according to $E_0$ as in known devices, the control member must be moved in a very non-uniform manner.

The invention has also particular advantages when used in conjunction with calculating mechanism of the kind described in the specification of United States patent application Serial No. 65,125 now Patent 2,235,826, dated March 25, 1941, or with apparatus and fire control systems embodying such mechanism. The mechanism referred to is adapted to obtain the height ($H_0$) of an aerial target, such as an aircraft, from observational data thereon provided by a range-finder. The mechanism is adapted to receive data comprising the unknown height $H_0$ on the one hand, and a function of the angle of elevation $E_0$ obtained from a range-finder on the other hand, this function preferably being cot $E_0$, and to calculate from these data a function of slant range.

In accordance with the principles of the above-mentioned prior invention, the unknown height $H_0$ set into the mechanism is so controlled that this calculated function of slant range is kept matched against observational slant range data provided by the range-finder, and the mechanism is such that, when this is done, the unknown height $H_0$ set into the mechanism is thereby automatically made proportional to the actual height of the target.

Since the preferred form of the calculating mechanism is one in which the mechanism is controlled by a member moving proportionally to cot $E_0$, this preferred form can be very advantageously associated with the method of control of the range finder forming the subject of the present invention, since thereby the control member for the range-finder and the elevation control member for the calculating mechanism move proportionally, and can therefore be linked together in any convenient manner.

Bearing these points in mind the invention further consists in apparatus for ascertaining the distance of a moving object, embodying in combination an adjustable observation device, and calculating mechanism of the kind referred to above, including a part operable in accordance with a function of the cotangent of an angle which is a factor in the calculation being made, comprising common control means the movement of which adjusts the observation device and is transmitted to the calculating mechanism. The single control means, such as a handle or handwheel may be situated at the observation device, e. g. a range-finder, and operated by the range-finder elevation operator. As a result of this feature of the invention, a "follow-the-pointer" operator, engaged in the task of matching elevation dials or pointers, can be dispensed with.

The calculating mechanism referred to may be mounted directly on the range-finder, so that the height of the target is determined at the range-finder, from which it may be transmitted to other apparatus. Alternatively, the movement of the elevation control handle (which is proportional to cot $E_0$) may be transmitted directly to a gun fire director incorporating calculating mechanism of the kind referred to, so as to actuate an elevation receiver there, this receiver operating the calculating mechanism either directly or through a servo motor. In this last mentioned form of the invention, the movements of the slant range control handle may also be transmitted directly to a repeater at the director, and the movements of this repeater may constitute the function of slant range which is to be kept matched by the calculating mechanism.

The control of the range-finder according to cot $E_0$ may readily be effected by a control handle which sets a pin, or its equivalent, to determine the length of the base of a right-angled triangle of fixed height. The pin engages with a slot, or its equivalent, in a pivoted member representing the third side of the triangle. Preferably, this pivoted member is rigid with or solid with the elevating parts of the range-finder, so that the trunnion axis of the range-finder forms the vertex of the triangle, and so that the elevating parts are directly elevated about this axis with the least possible number of moving parts.

At angles of elevation below a definite small angle, e. g. five degrees, the control instead of operating in proportion to cot $E_0$ may be arranged to operate in accordance with another function of the angle of elevation, in order that angles of elevation down to zero, and also negative angles, may be set by the control. As stated above, this function should be such that over the small angular range in question the control operates at a rate greater than in proportion to cot $E_0$. For this purpose, the whole triangle mechanism above referred to may be made rotatable relatively to the base of the range-finder. At small angles of elevation, the whole mechanism, together with the elevating parts of the range-finder, may then be rotated, either a different control handle being used, or means being provided by which the same control handle as is used for large angles may be brought into engagement with additional mechanism for effecting this second rotation. Preferably, however, only one, rather than two moving systems, is employed, and means are provided by which the same control member determines the motion throughout, the movement being according to cot $E_0$ for large angles, and being according to another function of $E_0$ for small angles. This result may be obtained by arranging that the portion of the slot in the hypotenuse of the triangle mechanism which is employed for large angles is straight, whereas the portion which is employed at low angles of elevation is curved.

The invention will become apparent from the following description of two forms (given, however, merely by way of example) which it may assume, and this description will be more readily followed by reference to the accompanying drawings wherein:

Fig. 1 is an elevation of a range-finder or height-finder incorporating a cotangent elevation control in accordance with the present invention and adapted to transmit data to a gun fire director:

Fig. 2 is an end view of the range-finder of Fig. 1:

Fig. 4 is an elevation of a range-finder in accordance with the invention which includes data converting mechanism for finding the height of the target:

Fig. 5 is an end elevation of the range-finder of Fig. 4:

Fig. 7 illustrates a modification of the range-determining mechanism.

Figure 3:
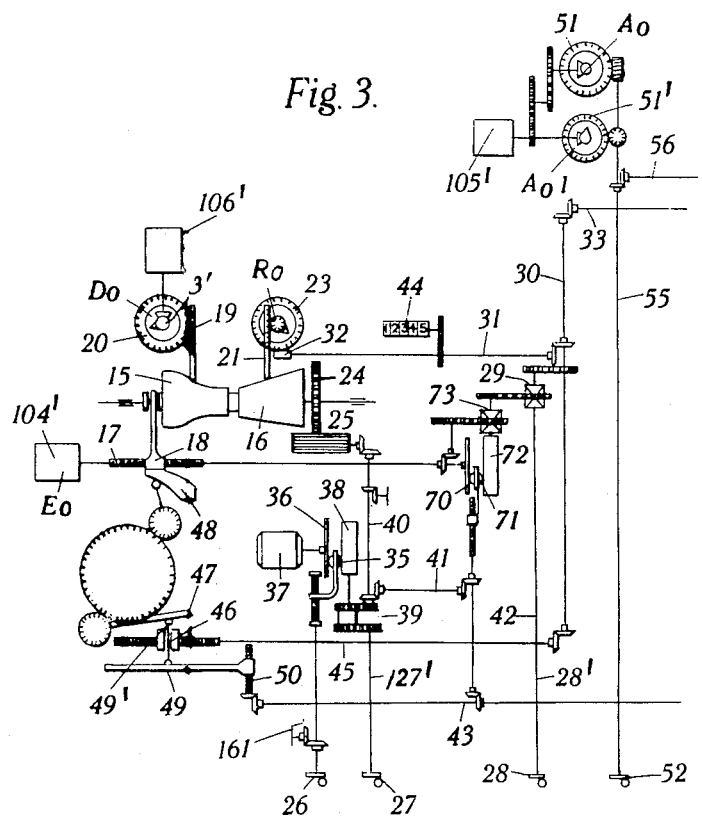
Fig. 3 is a schematic diagram of parts of a gun fire director adapted to receive data from the range-finder and to calculate therefrom more suitable data for use in the director.

In carrying the invention into effect in one convenient manner, as shown in Figs. 1 and 2 herewith, a range-finder comprises a main frame 1 rotatable in azimuth on a central king-post under the control of an azimuth or training control handle 2. The frame 1 has two arms 3, 4, on which are mounted brackets 5, 6, containing bearings for the range-finder tube 7 containing the optical parts of the range-finder.

The tube 7 is rotatable about its axis in the bearings 5, 6, in order to elevate the line of sight. The control in elevation is effected by means of a handle 8 which turns a horizontal screw 9 through gearing 10, 11. On the screw 9 is mounted a nut 12 which engages with an arm 13 fixed to the tube 7, by a pin 14 and slot 15 connection or its equivalent. For the greater part of its length the slot 15 is straight, the centre line of the straight part passing through the axis of the tube 7 and lying substantially parallel to the line of sight. For angles of elevation above a certain value the nut 12 is located on the screw 9 close enough to the axis of the tube 7 for the pin 14 to lie in the straight part of the slot 15. The distance of the pin 14 from a point on the screw 9 immediately below the axis of tube 7 is then proportional to the cotangent of the elevation angle $E_0$ of the line of sight. Thus the rotation of the control handle 8 to keep a target sighted is proportional to cot $E_0$. Since, as above stated, the effective length of screw 9 between pin 14 and a point directly below the center of tube 7 is proportional to the cotangent of the elevation angle ($E_0$), the perpendicular distance from said center to the axis of the screw is proportional to the altitude of the target and the effective length of arm 13 between pin 14 and said center is proportional to slant height ($D_0$) of the target. The screw 9 and arm 13 (as to their effective lengths) and that portion of frame 1 which includes the center of rotation of tube 7 and the bearing for screw 9, therefore, form a scale representation of the right triangle having target horizontal range ($R_0$) as a base, target altitude ($H_0$) as altitude and target slant range ($D_0$) as a hypothenuse.

Handle 8 directly drives an electrical transmitter 104 which transmits to a receiver 104' (Fig. 3) in the gun fire director. Transmitter 104 and receiver 104' may be, for example, the transmitting and receiving instruments of a self-synchronous transmission system such as is described in U. S. Patent 1,509,248, issued to E. Meitner. Similarly handle 2 directly drives a transmitter 105 which transmits to a receiver 105' in the director. Also, the knob 16 controlling the setting of the range prism is geared to a transmitter 106 which transmits to a receiver 106' in the director.

As shown in Fig. 3 the azimuth receiver 105' directly positions one element of a "match-the-pointer" indicator 51 which is kept matched by an operator who manipulates handle 52. In this way the azimuth angle $A_0$ is fed in via shafts 55, 56 to the predicting mechanism (not shown). This mechanism may be of the kind shown in Patent No. 2,235,826 above referred to, in which there is also shown and described apparatus similar in some respects to that in Fig. 3 of the present specification.

The receiver 106' operates an indicator 20 for slant range $D_0$ which is kept matched by handles 26, 27 which together control, through shaft 40 and gears 25, 24, the rotation of the camoids 15, 16, and thereby the lift of the cam follower 19, which rotates the matching dial of indicator 20. The lift of the cam pin as a function of the rotation of shaft 40 depends on the shape of the cam formed by taking a plane section of the camoid 15 through the cam follower 19. The camoids 15, 16 are displaceable axially by the receiver 104', rotation of which causes nut 18 to advance along screw 17 taking with it the bearing frame for the camoids. Corresponding to different positions of the nut 18 different parts of the camoid 15 lie under the cam follower pin 19 so that different amount of rotation of shaft 40 are required to make cam pin 19 match indicator 20. The rotation of shaft 40 therefore depends partly on the rotation of the slant range receiver 106' and partly on that of the elevation receiver 104'. The camoid 15 is so laid out that the rotation of shaft 40 required to cause the indicator to be matched is $D_0 \sin E_0$, i. e. $H_0$, the height of the target.

The rotation of the shaft 40 is fed into the predictor via shafts 41 and 43. In order to make the rotation of shaft 40 smooth it is continuously rotated by a variable speed gear comprising a constant speed-motor 37 driving a disc 36 which in turn drives a cylinder 38 through an interposed ball 35. The radial position of the ball 35 on the disc 36 is adjustable by handle 26 so as to vary the rate of rotation of the cylinder 38. Cylinder 38 drives shaft 40 through differential 39, by means of which handle 27 is enabled to provide corrections to the angular position of shaft 40.

The rotation of shaft 40 is also applied via shaft 41 to position a ball 71 on a disc 70. The radial position of the ball 70 is thus proportional to the height $H_0$ of the target, while the rotation of disc 70 is proportional to $\cot E_0$. It follows that the rotation of cylinder 72 is proportional to the product $H_0 \cot E_0$. This quantity is the horizontal range $R_0$, which is fed into the predictor via differentials 13, 29, and shafts 30 and 33. The variable speed gear 70, 71, 72, ensures that horizontal range $R_0$ is obtained automatically and smoothly, but since a constant rate will not always keep the line of sight on the target a handle 28 is provided by which corrections may be effected manually in order to make the rotation of shaft 30 correct. Correctness is judged by the matching of the horizontal range indicator 23, one part of which is operated from shaft 30 via shaft 31 and worm 32 while the other part is operated from the pin 21 which follows the camoid 16. This camoid is so laid out that when translated according to $\cot E_0$ and rotated according to $H_0$ it causes the cam-follower pin to be lifted by a distance $H_0 \cot E_0$, i. e. $R_0$.

For low angles of elevation $E_0$, a different mechanism is made use of. As has been stated, rotation of the elevation receiver 104' causes translation of the nut 18. Fixed to this nut is a cam 48 with which co-operates a cam follower of the pivoted arm type, this arm being geared to operate another arm 47 so as to turn it through the angle $E_0$. For low angles of elevation an operator operates the range handle so that a revolution counter 44 on shaft 31 indicating the horizontal range in yards matches a slant-range reading on dial 20. The rotation of shaft 31, thus made equal to $R_0$, is also applied to shaft 45, so as to position a nut 46 at a distance proportional to $R_0$ from the pivot of arm 47. The height-control handles 26, 27, are now operated, not to keep the two parts of the indicator 20 matched, but to keep the top of a rod 49', vertically slidable through the nut 46 via shafts 41, 43 screw 50 and nut 49, matched with the arm 47. When the top of the vertical arm 49 is matched with pivot arm 47, shaft 43 is positioned in proportion to the approximate altitude ($H_0$) of the target, in this instance, the proportional approximate horizontal range ($R_0$) being set up by the position of nut 46 on its screw and the elevation angle ($E_0$) being represented by the angular position of arm 47 with respect to the axis of said screw.

For small angles of elevation we may also supersede the $\cot E_0$ method of elevating the range finder by a method in accordance with a different law. For this purpose the slot 15 in the arm 13 is not straight throughout its length, but the end portion 118 is curved downwards as shown in Fig. 1, so that the nut 12 does not have to travel so far to elevate the arm 13 through a given angle as would be the case if the slot were straight. Preferably the curved portion comes into operation only at angles so low as to correspond to slant ranges beyond the range of a gun in the case of aircraft flying at normal heights.

The mechanism illustrated in Fig. 3 employs a member (screw 17) moved proportionally to $\cot E_0$. For this reason, the method of elevation control of the range finder shown in Figs. 1 and 2 is especially useful when mechanism similar to that shown in Fig. 3 is used in the fire control director which co-operates with the rangefinder. The same advantages are derived if the director incorporates mechanism other than that shown in Fig. 3 but corresponding to it in so far as it uses a member moving proportionally to $\cot E_0$.

Figure 6:
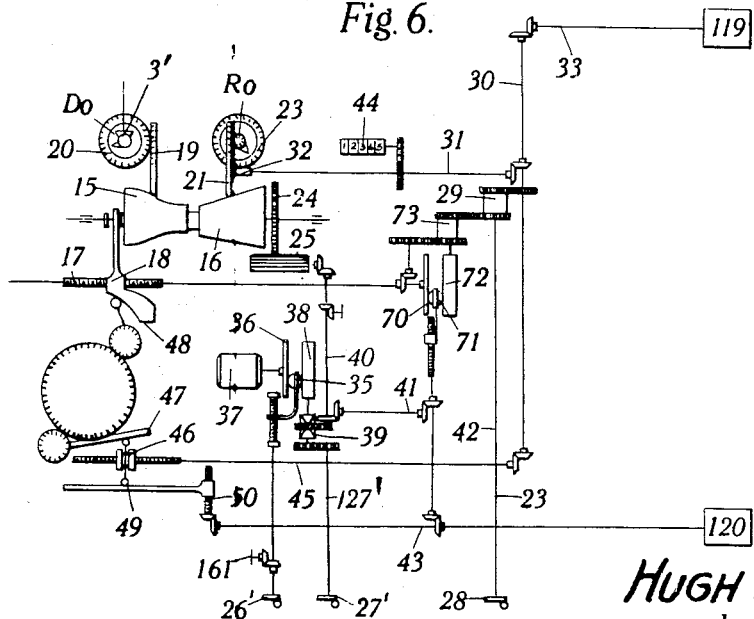
Fig. 6 is a schematic diagram of the mechanism of the range-finder of Figs. 4 and 5.

Figs. 4, 5 and 6 show another type of rangefinder provided with data-converting mechanism to find the height and horizontal range of a target and to transmit these, e. g. to a gun-fire director. Reference numerals in these figures correspond to those in Figs. 1, 2 and 3 where applied to similar members.

As before, the azimuth or training handle 2 controls the range-finder in azimuth and a transmitter operated by it (not shown) transmits training data to a gun-fire director.

The shaft of the range control handle 16' is extended into the calculating box 51 mounted on the range-finder and directly positions the pointer 3' of the indicator 20. The shaft 117 of the elevation control handle 8 is also extended into box 51 or extension 52' thereof to operate, through gearing not shown, shaft 17 (Fig. 6). An operator controls the concentric knobs 26' and 27' to keep the pointer 3' and dial of the indicator 20 properly matched, or, at low elevations, to keep members 47 and 49' in suitable relationship. Another operator controls the handle 28 to keep the horizontal range dials 23 matched, or at low elevations to keep indicator 20 and range counter 44 in correspondence.

As in Fig. 3 the result attained is that shafts 33 and 43 turn proportionally respectively to the horizontal range and the height of the target. Transmitters 119, 120 may be operated from these shafts to position repeaters at a gun-fire director. A height indicator may also be operated from shaft 43.

In a modification of the invention illustrated in Fig. 7, instead of using handle 16' to control the coincidence prism or like range-determining part of the range-finder, the latter is controlled directly by the output of the cam follower 19 so that the prism or like part is set from the control knob 27'. This is accomplished by providing an extra rack on cam follower 19 with which a pinion 101 on shaft 103 meshes to actuate the range determining device in accordance with the lift of follower 19.

It should be understood that the invention is not restricted solely to the details of the forms described herein since various modifications may be introduced as they become desirable in order to carry the invention into effect under different conditions and requirements which have to be fulfilled, without departing from the scope of the invention.

What I claim is:

1. In apparatus for determining the height of a remote object, a tubular member mounted with its axis substantially horizontal and pivoted for rotation about said axis, an arm having a slot including a straight portion extending from said member in a plane normal to said axis, a threaded rod positioned along a line in said plane not intersecting said axis, a block in threaded engagement with said rod and in sliding engagement with said slot, and optical means mounted on said tubular member defining a line of sight, said line of sight being rotatable with said member for training on said object whereby displacement of said block along said rod from a reference position when in engagement with the straight portion of said slot rotates said tubular member through an angle whose cotangent is proportional to the displacement of said block.

2. In apparatus for determining the height of a remote object, a member rotatable about a substantially horizontal axis, a slotted arm extending from said member in a plane normal to said axis, said slot having a straight and a curved portion forming a continuous guide, a threaded rod positioned along a line in said plane not intersecting said axis, a block in threaded engagement with said rod and in sliding engagement with said slot, optical means mounted on said rotatable member defining a line of sight, and means for training said line of sight on said object including means for rotating said rod whereby said block is displaced along said rod and thereby rotates the line of sight from the horizontal through an angle whose cotangent is proportional to the displacement of said block from a reference position when said block is in engagement with the straight portion of said slot and through a greater angle when said block is in engagement with the curved portion of said slot.

3. In apparatus for determining the distance of a remote object from a horizontal datum plane, optical means determining a line of sight, mounting means for said optical means rotatable about a substantially horizontal axis, means for rotating said mounting means for angularly positioning said line of sight in elevation, comprising a slotted arm extending from said mounting means, said slot having a straight and a curved portion forming a continuous guide, a threaded rod positioned along a line in a plane perpendicular to said axis but not intersecting said axis, a block in threaded engagement with said rod and in sliding engagement with said slot, and means for rotating said rod, whereby displacement of said block along said rod by virtue of the rotation thereof is caused to position the line of sight in elevation, the displacement of said block from a position corresponding to zero elevation being proportional to the cotangent of the angle of elevation for angles greater than approximately 5° when said block is in engagement with the straight portion of said slot and proportional to a quantity less than the cotangent of the angle of elevation for angles less than approximately 5° when said block is in engagement with the curved portion of said slot.

4. In computing apparatus for gunfire control, a support mounted for rotation with respect to a frame about a normally horizontal axis, optical means defining a line of sight mounted on said support, said line rotating with said support, and means for rotating said support about said axis, comprising means forming a triangular assembly of members with said frame, one of said members being operatively connected at one extremity thereof to said frame and being independently variable in effective length by extension at the other extremity thereof, and another member being effectively extensible by having one extremity of the effective portion thereof operatively connected to the displaceable extremity of said first member and the opposite extremity thereof rigidly connected to said support, said frame thereby constituting the third member of said triangle, and means for varying the effective length of said first member to direct said line of sight on a target in elevation, the operative connection between the variable members of said triangular assembly being formed to provide one relation between the effective lengths of said first and second members for one range of said independent variation and a different relation for another range.

5. In computing apparatus for gunfire control, a support mounted for rotation with respect to a frame about a normally horizontal axis, optical means defining a line of sight mounted on said support, said line rotating with said support, and means for rotating said support about said axis, comprising means forming a triangular assembly of members with said frame, one of said members being operatively connected at one extremity thereof to said frame and being independently variable in effective length by extension at the other extremity thereof and another member being effectively extensible by having one extremity of the effective portion thereof operatively connected to the displaceable extremity of said first member and the opposite extremity thereof rigidly connected to said support, said frame thereby constituting the third member of said triangle, and means for varying the effective length of said first member to direct said line of sight on a target in elevation, the operative connection between the variable members of said triangular assembly being formed by a pin and slot connection, the slot having a straight and a curved portion.

6. In computing apparatus for gunfire control, a support mounted for rotation with respect to a frame about a normally horizontal axis, optical means mounted on said support defining a line of sight, said line rotating with said support, and means for rotating said support about said axis, comprising a pair of members forming a triangular assembly with said frame, one of said members being operatively connected at one extremity thereof to said frame and independently variable in effective length by extension at the other extremity thereof and the other of said members being effectively extensible by having one extremity of the effective portion thereof operatively connected to the displaceable extremity of said first member and the opposite extremity thereof rigidly connected to said support, said frame thereby forming the third member of said triangle, and means for varying the effective length of said first member to direct said line of sight on a target in elevation, the operative connection between the two variable members of said triangular assembly being formed to provide one relation between the effective lengths of said first and second members for a range of said independent variation corresponding to small angles of elevation of said line of sight and a different relation for another range corresponding to large angles of elevation of said line of sight.

HUGH MURTAGH.